United States Patent [19]
Cartwright, Jr.

[11] Patent Number: 6,075,942
[45] Date of Patent: *Jun. 13, 2000

[54] ENCODING MACHINE-SPECIFIC OPTIMIZATION IN GENERIC BYTE CODE BY USING LOCAL VARIABLES AS PSEUDO-REGISTERS

[75] Inventor: Robert S. Cartwright, Jr., Chelmsford, Mass.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/072,308

[22] Filed: May 4, 1998

[51] Int. Cl.[7] .................................................. G06F 9/445

[52] U.S. Cl. .............................................. 395/709

[58] Field of Search .................................. 395/705, 706, 395/707, 709; 712/200

[56] References Cited

U.S. PATENT DOCUMENTS

| | | | |
|---|---|---|---|
| 5,287,490 | 2/1994 | Sites | 395/500 |
| 5,301,325 | 4/1994 | Benson | 395/707 |
| 5,339,238 | 8/1994 | Benson | 395/707 |
| 5,450,575 | 9/1995 | Sites | 395/707 |
| 5,649,203 | 7/1997 | Sites | 395/709 |
| 5,881,278 | 3/1999 | Tran et al. | 712/242 |
| 5,918,053 | 6/1999 | Graham | 717/4 |
| 5,995,754 | 11/1999 | Holzle et al. | 717/9 |
| 5,999,731 | 12/1999 | Yellin et al. | 717/4 |
| 6,021,273 | 2/2000 | Griesemer | 717/5 |
| 6,026,485 | 2/2000 | O'Connor et al. | 712/226 |

OTHER PUBLICATIONS

AN: 97: 340397, Title: Architecture is key to execution in Java, author: Shaw, George, source: Electronic Engineering Times, Jun. 16, 1997.

AN: 1998: 18014, Title: LSI Logic License IS–95 Protocol Stack Software From ISOTEL Research, Source: PR Newswire, (Apr. 13, 1998).

AN: 1998: 40475, Title: Optimized RISC core is in the details Introduces the CR16B, a new line of RISC devices, Author: Naveh, Aolon, source Electronic Engineering Times, Jan. 12, 1998.

AN: 538632, Title: RISC contenders copy x86 champions, source: electronic Engineering Times, Nov. 7, 1994).

AN:406005, Title: Sun Reveals First Java Processor Core, source: Microprocessor Report, Oct. 28, 1996.

AN: 97:371330, Title: Co–engineering optimizes performance Eliminates the need to use assembly language programming in developing its TMS320C6X DSP, Author: Simar, Ray, source: Electronic Engineering Times (Jul. 7, 1997).

(List continued on next page.)

*Primary Examiner*—Eric W. Stamber
*Assistant Examiner*—Chameli Chaudhuri Das
*Attorney, Agent, or Firm*—Cesari and McKenna, LLP

[57] ABSTRACT

A first computer system (34) compiles a source program into machine code for a register-oriented microprocessor, optimizing the global allocation of microprocessor registers in the process. It then translates the resultant code into generic-machine operand-stack-oriented code. In performing the translation, it generates code that preserves the register-oriented code's microprocessor-register allocation by filling the operand stack from local variables chosen in accordance with a predetermined correspondence between local variables and microprocessor registers. That code also stores the operand stack's contents in accordance with that same correspondence. A second computer system (32), which employs the register-oriented microprocessor, converts the resultant generic machine code into its own machine code in accordance with the same association between local variables to microprocessor registers.

22 Claims, 10 Drawing Sheets

OTHER PUBLICATIONS

AN: 96:431111, Title: RADVision offers first commercially available H.323 Software Stack for Videoconferencing Manufactures, Source: Business Wire, Aug. 15, 1996.

Krall A. et al: "Cacao–a 64–bit JavaVM just–in–time compiler" Concurrency: Practice and Experience, vol. 9, No. 11, Nov. 1997 (1997–11), pages 1017–1030, XP002117590, Wiley, UK ISSN: 1040–3108 abstract page 1021, line 1, page 1024, line 34.

Louden, K: "P–Code and Compiler Portability: Experience with a Modula–2 Optimizing Compiler" ACM Sigplan Notices, vol. 25, No. 5, 1 May 1990 (1990–05–01), pp. 53–59, XP000351655 New York, US ISSN: 0362–1340 abstract p. 56, line 1, p. 58, line 26.

Krall, A: "Efficient JavaVM just–in–time compilation" Proceedings. 1998 International Conference on Parallel Architectures and Compilation Techniques (Cat. No. 98EX192), Paris, France, 12–18 Oct. 1998, pp. 205–212, XP002117591 1998, Los Alamitos, Ca., USA, IEEE Comput. Soc, USA ISBN: 0–8186–8591–3 abstract p. 206, left–hand column, line 42, p. 207, left–hand column, line 43, p. 207, right–hand column, line 4, line 18, p. 209, left–hand column, line 10, last line.

Carr H. et al: "An emulator for Utah Common Lisp's abstract virtual register machine" 1987 Rochester Forth Conference One Comparative Computer Architectures, Rochester, NY, USA; Journal of Forth Application and Research, vol. 5, No. 1, 1987, pp. 113–116, XP002117592 USA ISSN: 0738–2022.

Title: Sun Reveals First Java Processor Core, Source: Microprocessor Report, Oct. 28, 1996.

Title: Java translation is up–front operation Develops Java front end for it s GNU compiler which translates Java byte code into machine code Author: Bothner, Per Source: Electronic Engineering ISSN: 0192–1541, Sep. 29, 1997.

Title: Java set to pour out potent solutions, Source: Electronic Engineering Times, May 6, 1996.

Title: Architecture is key to execution in Java, Author: Shaw, George, Source: Electronic Engineering Times, June. 16, 1997.

J.R. Allen et al., "Conversion of Control Dependence to Data Dependence," Tenth Annual ACM Symposium on Principles of Programming Languages, Austin, Texas, 1983.

S. Carr et al., "Scalar Replacement in the Presence of Conditional Control Flow," Center for Research on Parallel Computation, CRPC–TR92283, Rice University, Houston, Nov. 1992.

```
int area = 0, volume = 0, height
for (height = 0; height < 10000000: height++) {
    area += length * width;
    volume += length * width * height;
}
```

| | Instruction | Stack Contents | Comment |
|---|---|---|---|
| 0 | iconst_0 | 0 | |
| 1 | istore_2 | | Set *area* to 0 |
| 2 | iconst_0 | 0 | |
| 3 | istore_3 | | Set *volume* to 0 |
| 4 | iconst_0 | 0 | |
| 5 | istore 4 | | Set *height* to 0 |
| 7 | goto 28 | | Start loop |
| 10 | iload_2 | area | Load *area* |
| 11 | iload_0 | area, length | Load *length* |
| 12 | iload_1 | area, length, width | Load *width* |
| 13 | imul | area, length * width | Multiply |
| 14 | iadd | area + length * width | Add |
| 15 | istore_2 | | Store as *area* |
| 16 | iload_3 | vol | Load *volume* |
| 17 | iload_0 | vol, length | Load *length* |
| 18 | iload_1 | vol, length, width | Load *width* |
| 19 | imul | vol, length * width | Multiply |
| 20 | iload 4 | vol, length * width, height | Load *height* |
| 22 | imul | vol, length * width * height | Multiply |
| 23 | iadd | vol + length * width * height | Add |
| 24 | istore_3 | | Store as *volume* |
| 25 | iinc 4 1 | | Increment *height* |
| 28 | iload 4 | height | Load *height* |
| 30 | ldc #1 <Integer 10000000> | 10,000,000 - height | Compare to height limit |
| 32 | if_icmplt 10 | | Branch on result |

FIG. 3

| | INSTRUCTION | REGISTER | | | | | | |
|---|---|---|---|---|---|---|---|---|
| | | %i0 | %i1 | %i2 | %i3 | %o0 | %o1 | %o2 |
| A | sethi %hi(0x989400), %o2 | | | | | | | 9999360 |
| B | smul %i1, %i2, %o0 | | I | w | | lw | | 9999360 |
| C | add %o2, 640, %i3 | | I | w | $10^7$ | lw | | 9999360 |
| D | clr %i1 | | 0 | w | $10^7$ | lw | | 9999360 |
| E | clr %i2 | 0 | 0 | 0 | $10^7$ | | | 9999360 |
| F | clr %i0 | 0 | 0 | 0 | $10^7$ | lw | | 9999360 |
| G | clr %o1 | 0 | 0 | 0 | $10^7$ | lw | 0 | 9999360 |
| .L1: | | | | | | | | |
| H | add %i0, 1, %i0 | h | A | V | $10^7$ | lw | 0 | 9999360 |
| I | add %i2, %o1, %i2 | h | A | V | $10^7$ | lw | ΔV | 9999360 |
| J | add %i1, %o0, %i1 | h | A | V | $10^7$ | lw | ΔV | 9999360 |
| K | cmp %i0, %i3 | h | A | V | $10^7$ | lw | ΔV | 9999360 |
| L | bl .L1 | h | A | V | $10^7$ | lw | ΔV | 9999360 |
| M | add %o1, %o0, %o1 | h | A | V | $10^7$ | lw | ΔV | 9999360 |

FIG. 5

| INSTRUCTION | STACK | 0 %i0 | 1 %i1 | 2 %i2 | 3 %i3 | 24 %o0 | 25 %o1 | 26 %o2 |
|---|---|---|---|---|---|---|---|---|
| A | sethi %hi(9999360), %o2 | | | | | | | |
| A1 | ldc #1 | 9999360 | | l | w | | | |
| A2 | istore 26 | | | l | w | | | 9999360 |
| B | smul %i1, %i2, %o0 | | | | | | | |
| B1 | iload_1 | l | | l | w | | | 9999360 |
| B2 | iload_2 | l,w | | l | w | | | 9999360 |
| B3 | imul | lw | | l | w | | | 9999360 |
| B4 | istore 24 | | | l | w | | lw | 9999360 |
| C | add %o2, 640, %o0 | | | | | | | |
| C1 | iload 26 | 9999360 | | l | w | | lw | 9999360 |
| C2 | ldc #2 | 9999360, 640 | | l | w | | lw | 9999360 |
| C3 | iadd | 10,000,000 | | l | w | | lw | 9999360 |
| C4 | istore_3 | | | l | w | $10^7$ | lw | 9999360 |
| D | clr %i1 | | | | | | | |
| D1 | iconst_0 | 0 | | l | w | $10^7$ | lw | 9999360 |
| D2 | istore_1 | | | 0 | w | $10^7$ | lw | 9999360 |
| E | clr %i2 | | | | | | | |
| E1 | iconst_0 | 0 | | 0 | w | $10^7$ | lw | 9999360 |
| E2 | istore_2 | | | 0 | 0 | $10^7$ | lw | 9999360 |
| F | clr %i0 | | | | | | | |
| F1 | iconst_0 | 0 | | 0 | 0 | $10^7$ | lw | 9999360 |
| F2 | istore_0 | | 0 | 0 | 0 | $10^7$ | lw | 9999360 |
| G | clr %o0 | | | | | | | |
| G1 | iconst_0 | 0 | 0 | 0 | 0 | $10^7$ | lw | 9999360 |
| G2 | istore_25 | | 0 | 0 | 0 | $10^7$ | 0 | 9999360 |

FIG. 6A

| INSTRUCTION | | STACK | 0 %i0 | 1 %i1 | 2 %i2 | 3 %i3 | 24 %o0 | 25 %o1 | 26 %o2 |
|---|---|---|---|---|---|---|---|---|---|
| H | add %i0, 1, %i0 | | | | | | | | |
| H1 | iload_0 | h | h | A | V | $10^7$ | lw | $\Delta$V | 9999360 |
| H2 | iconst_1 | h,1 | h | A | V | $10^7$ | lw | $\Delta$V | 9999360 |
| H3 | iadd | 1 | h | A | V | $10^7$ | lw | $\Delta$V | 9999360 |
| H4 | istore_0 | | h | A | V | $10^7$ | lw | $\Delta$V | 9999360 |
| I | add %i2, %o1, %i2 | | | | | | | | |
| I1 | iload_2 | 0 | 1 | 0 | 0 | $10^7$ | lw | $\Delta$V | 9999360 |
| I2 | iload 25 | 0, 0 | 1 | 0 | 0 | $10^7$ | lw | $\Delta$V | 9999360 |
| I3 | iadd | 0 | 1 | 0 | 0 | $10^7$ | lw | $\Delta$V | 9999360 |
| I4 | istore_2 | 0 | 1 | 0 | 0 | $10^7$ | lw | $\Delta$V | 9999360 |
| J | add %i1, %o0, %i1 | | | | | | | | |
| J1 | iload_1 | A | h | A | V | $10^7$ | lw | $\Delta$V | 9999360 |
| J2 | iload 24 | A, lw | h | A | V | $10^7$ | lw | $\Delta$V | 9999360 |
| J3 | iadd | A + lw | h | A | V | $10^7$ | lw | $\Delta$V | 9999360 |
| J4 | istore_1 | | h | A | V | $10^7$ | lw | $\Delta$V | 9999360 |
| M | add %o1, %o0, %o1 | | | | | | | | |
| M1 | iload 25 | $\Delta$V | h | A | V | $10^7$ | lw | $\Delta$V | 9999360 |
| M2 | iload 24 | $\Delta$V, lw | h | A | V | $10^7$ | lw | $\Delta$V | 9999360 |
| M3 | iadd | $\Delta$V + lw | h | A | V | $10^7$ | lw | $\Delta$V | 9999360 |
| M4 | istore 25 | | h | A | V | $10^7$ | lw | $\Delta$V | 9999360 |
| K | cmp %i0, %i3 | | | | | | | | |
| L | bl .L1 | | | | | | | | |
| KL1 | iload_0 | h | h | A | V | $10^7$ | lw | $\Delta$V | 9999360 |
| KL2 | iload_3 | h, $10^7$ | h | A | V | $10^7$ | lw | $\Delta$V | 9999360 |
| KL3 | if_icmplt .L1 | | h | A | V | $10^7$ | lw | $\Delta$V | 9999360 |

FIG. 6B

ENCODING MACHINE-SPECIFIC OPTIMIZATION IN GENERIC BYTE CODE BY USING LOCAL VARIABLES AS PSEUDO-REGISTERS

BACKGROUND OF THE INVENTION

The present invention is directed to compiling computer programs. It particularly concerns arrangements for compiling in one machine programs to be executed by another.

As is well known, a computer typically operates by fetching the contents of a memory location that a program counter specifies and then interpreting the binary code thus fetched as a machine-language instruction. The instruction always includes an operation code, i.e., a binary number that represents one of the repertoire of atomic operations of which that particular microprocessor is capable. One such atomic operation, for instance, is the addition of two integer operands. The instruction may additionally include codes for locations from which the operation's operands are to be drawn and the destination in which the operation's result is to be stored. So a single instruction may specify, for instance, that the microprocessor's arithmetic logic unit is to add the contents of microprocessor registers A and B and place the results in microprocessor register C.

As is also well known, manually programming a computer at this level is extremely time-consuming and error-prone. So compilers were early developed to write such machine code in response to higher-level instructions, which the programmer supplies. A compiler enables the human user to employ language that is much easier to understand than the numerical codes to which the microprocessor responds. Also, it usually takes much fewer compiler-language instructions than machine-language instructions to define a given procedure. Some compilers additionally check for lapses in consistency, alerting the programmer when, say, the program as written would add a string to an integer. And the compiler language employed by a human programmer can be independent of the particular microprocessor type that ultimately will execute the computer-generated machine code; the compiler can concern itself with the type of machine on which the code is to execute and relieve the human programmer of the need to be aware of different microprocessors' peculiarities.

A further advantage of many high-performance compilers is that they optimize the resultant machine code to some extent. A computer program can be thought of as a function that responds to inputs by generating outputs. It is ordinarily true that more than one set of steps is available that can produce an output having the desired relationship to the input, and it usually is also true that the amounts of time or other resources required to perform the different sets of steps differ widely. So many compilers have been provided with the intelligence to select one of the equivalent-output sets of atomic-step sequences that are relatively inexpensive in time or some other system resource.

A compiler that can perform all of these functions can be time- and resource-consuming in operation. So the compilation operation should be performed only once, if possible, rather than every time the resultant program is executed. Of course, this ideal cannot always be achieved; a given program may sometimes be run on more than one machine, and, because of the different machines' instruction repertoires and other features, different machine code will have to be produced from the same source (compiler) code. This ordinarily requires that different versions of the same compiler to produce machine code for the different executing machines.

A partial exception to this model of performing different compilations for different machines has resulted from the popular adoption of internetworking, in which millions of computer nodes are loosely interconnected in such a manner that communications occur between parties who are acquainted neither with each other nor with their respective types of computer equipment. This reality has given rise to the use of virtual-machine code. By far the most popular way to generate such code is to use a compiler that generates machine code from source code written in the Java™-programming language. (Sun, the Sun Logo, Sun Microsystem, and Java are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.) But the teachings of this invention described below are equally applicable to virtual-machine code generated from other-language source code.

A microprocessor used in implementing the machine code thus written does not ordinarily execute it directly: its program counter does not point to locations that contain the compiler-generated machine code. Instead, it emulates a "virtual machine" for which that code is written. The compiler can perform all of the expensive analysis required for optimized translation from high-level constructs to low-level atomic operations, and the resultant "byte code," as such virtual-machine code is typically called, can be sent to different users employing different machines. All they need is some relatively simple run-time code that enables their particular machines to emulate the virtual machine for which this byte code is intended.

To appreciate this approach's benefits, consider FIG. 1. Through various interface circuitry not shown, a user at a location 12 may employ a keyboard 14 and display 16 to enter compiler-language ("source") code into, say, a read/write memory 18. For the sake of concreteness, FIG. 2 sets forth a five-line fragment exemplifying such source code. The first line declares three variables area, volume, and height as integers. It also sets the initial values of area and height to zero. The second line specifies that the sequence of operations beginning with that line's opening brace and ending with the closing brace three lines later is to be repeated once for each value of height from 0 to 10,000,000-1. The third line, which is part of that sequence, indicates that area is to be incremented by the product of two values length and width. The fourth line states that volume is to be incremented by the product of length, width, and volume on every pass through that sequence. We assume for the sake of this example that the length and width variables have previously been declared integers and initialized to non-zero values.

A compiler program (in the form of machine code) is also loaded into memory 18 from, say, a disk drive 20. In accordance with that compiler program's machine-code instructions, a microprocessor 22 acts as a compiler, treating the user-entered compiler-language code as the compiler's input data and generating byte code as the compiler's output. A typical result of this operation would be byte code such as that which FIG. 3 represents mnemonically (i.e., in assembly language).

The first byte (byte 0) of that code represents "pushing" a zero-value integer onto a common operand stack associated with the method of whose definition the code fragment is a part. The next byte (byte 1) represents "popping" the operand stack's contents and storing them in local variable 2, one of a number of local variables associated with the method that the code implements. The machine code employs local variable 2 to contain the area value.

Bytes 2 through 6 represent similarly initializing the volume and height values. (The machine code requires only a single byte to specify that the top operand-stack value is to be stored in local variables 0, 1, 2, or 3. The underscore in, e.g. "istore_2" indicates that the local-variable reference is part of the same byte as the operation code. Instructions to store values in other variables use the generic integer-storage-operation code "istore." This code calls for an operation that pops the operand stack and stores the results in the local variable that the next byte specifies. So FIG. 3's line designated by off-set index 5 actually represents two bytes, and this is why the line after that bears offset index 7 rather than 6.)

The next six instructions best illustrate the virtual machine's stack-oriented nature. Bytes 10 through 12 contain operation codes that successively push the area, length, and width values onto the common operand stack. Byte 13 is simply an operation code for integer multiplication; it specifies no source or destination for the operands or result. This is characteristic of a stack-oriented machine: the source and destination for such machines' arithmetic operations are implicitly the common operand stack. As the line containing the byte-13 instruction indicates, that operation pops the operand stack's two top values, length and width, and pushes their product back onto the stack. The byte-14 instruction, whose operand code represents integer addition, similarly specifies that the operands are the top two stack values and that the result should be pushed back unto the stack. As the lines containing byte 15's instruction indicate, the next, "istore_2" instruction pops that result from the stack and stores it in the area-containing local variable 2.

A similar analysis of bytes 16 through 22 reveals that they update volume in accordance with the source program's directions and store the result in local variable 3. Bytes 25–28 represent incrementing the height variable, while bytes 30 and 32 represent branching to byte 10 if height has not yet reached the value, namely, 10,000,000, contained in the first entry of a constant pool included in the file that contains the byte code.

The resultant byte code will to be stored on the user's disk drive 20 or, say, on that of some other machine that acts as a "Web server." Such a machine responds to requests received by way of an internetwork, which FIG. 1 depicts in the customary manner as a cloud 28.

At a different location 30, a remote user, whose computer system 32 typically differs in many respects from the original programmer's system 34, receives from system 34 the file that contains the byte code produced at location 12. The computer systems and internetwork use electrical, electromagnetic, or optical signals that carry digital data streams. The signals that carry the digital data by which the computer systems exchange data are exemplary forms of carrier waves transporting the information.

When system 32 receives the byte code, it recognizes it as input to its virtual-machine-implementing program, such as the Java Runtime Environment. System 32's virtual-machine-implementing program accordingly produces the virtual machine's intended response to that byte code.

This approach has two principal advantages to the user at location 30. The first is that, even though the microprocessor that his system 32 employs is not necessarily of the same type as that used to compiled the code initially, he does not need to suffer the time cost that a full compilation of the source code for his own machine would necessitate; all that is necessary is the low-level conversion from the virtual machine's atomic operations to those of his own actual microprocessor.

The second is that the user at location 30 does not need to know or trust the virtual-machine code's source. If the remote source had instead compiled actual machine code that could run specifically on the microprocessor in system 32, there could be untoward consequences if the source by error or design included features that, say, adversely affect system 32's file system. In contrast, since the actual machine code that system 32's microprocessor executes is that of its own virtual-machine-implementing program or, at least, code that such a program has itself produced from the byte code, system 32's user needs only to trust his own virtual-machine software. Of course, the virtual-machine software is simulating a virtual-machine's response to code produced by a source not necessarily trusted, but the virtual-machine software can be (and, in the case of the Java Runtime Environment, actually is) so arranged as to prevent potentially destructive execution behavior, such as reading data locations' contents as instructions.

If the compilation operation's target is the virtual machine, it conventionally omits one feature found in conventional compilers. Specifically, the compiler that generates the virtual-machine code does not perform optimization that is specific to the actual machine on which the program will be run. Since different machines have different operation repertoires, register organizations, and so forth, a compiler targeted to a particular microprocessor can obtain an increment of performance for that processor that generic compilation does not conventionally afford. If the source compiler is not so targeted, the remote user's virtual-machine-implementation software, which is necessarily targeted to a specific actual machine, can perform a degree of optimization at its end. But the complexity of certain types of optimization, such as global register allocation by graph coloring, increases faster than linearly with the number of instructions in the code block being optimized, and the performance cost of having the run-time system perform such optimization can be unacceptable unless it is kept to a minimum. So the amount of machine-specific optimization that such systems perform is ordinarily quite limited.

SUMMARY OF THE INVENTION

At least where global register allocation is concerned, such machine-specific optimization can actually be performed at the source consistently with the present invention without preventing machines other than those of the targeted type from implementing the resultant byte code.

In the particular case of global register allocation, the virtual-machine code's nature might seem to preclude optimization at the source; the virtual machine's operands are drawn from a common stack, not from specified registers. Virtual-machine results are similarly directed implicitly to the operand stack, not explicitly to a specified register.

The virtual-machine code can nevertheless be employed to specify register allocation. This is done by treating certain local variables in the virtual-machine code as proxies for registers in the target register-oriented machine. Suppose, for example, that the programmer's compiler and the user's virtual-machine-implementing software both associate virtual-machine local variables A, B, and C with the target register-oriented machine's registers X, Y, and Z. To have the executing machine add the contents of registers X and Y and store the sum in register Z, the virtual-machine code would incorporate instructions that call (1) for the contents of variables A and B to be pushed to onto the stack, (2) for the addition to occur, and (3) for the top stack contents to be popped and stored into variable C.

The target microprocessor type's virtual-machine-implementing software can then execute optimized machine code simply by assigning registers in accordance with the predetermined association of registers with local variables; it does not have to perform the time-consuming register-allocation function. And microprocessors other than those of the type for which the routine is optimized can still run their virtual-machine-implementing processes on the resultant virtual-machine code, although not in an optimized fashion.

BRIEF DESCRIPTION OF THE DRAWINGS

The invention description below refers to the accompanying drawings, of which:

FIG. 3 is a listing of typical virtual-machine code generated from that source code in a conventional manner;

FIG. 5 is a table illustrating the operation of register-oriented machine code generated by the FIG. 4 method in a course of producing its byte code;

FIGS. 6A and 6B are table illustrating FIG. 4's translation of the microprocessor machine code into the virtual-machine byte code;

DETAILED DESCRIPTION OF AN ILLUSTRATIVE EMBODIMENT

Figure 4:
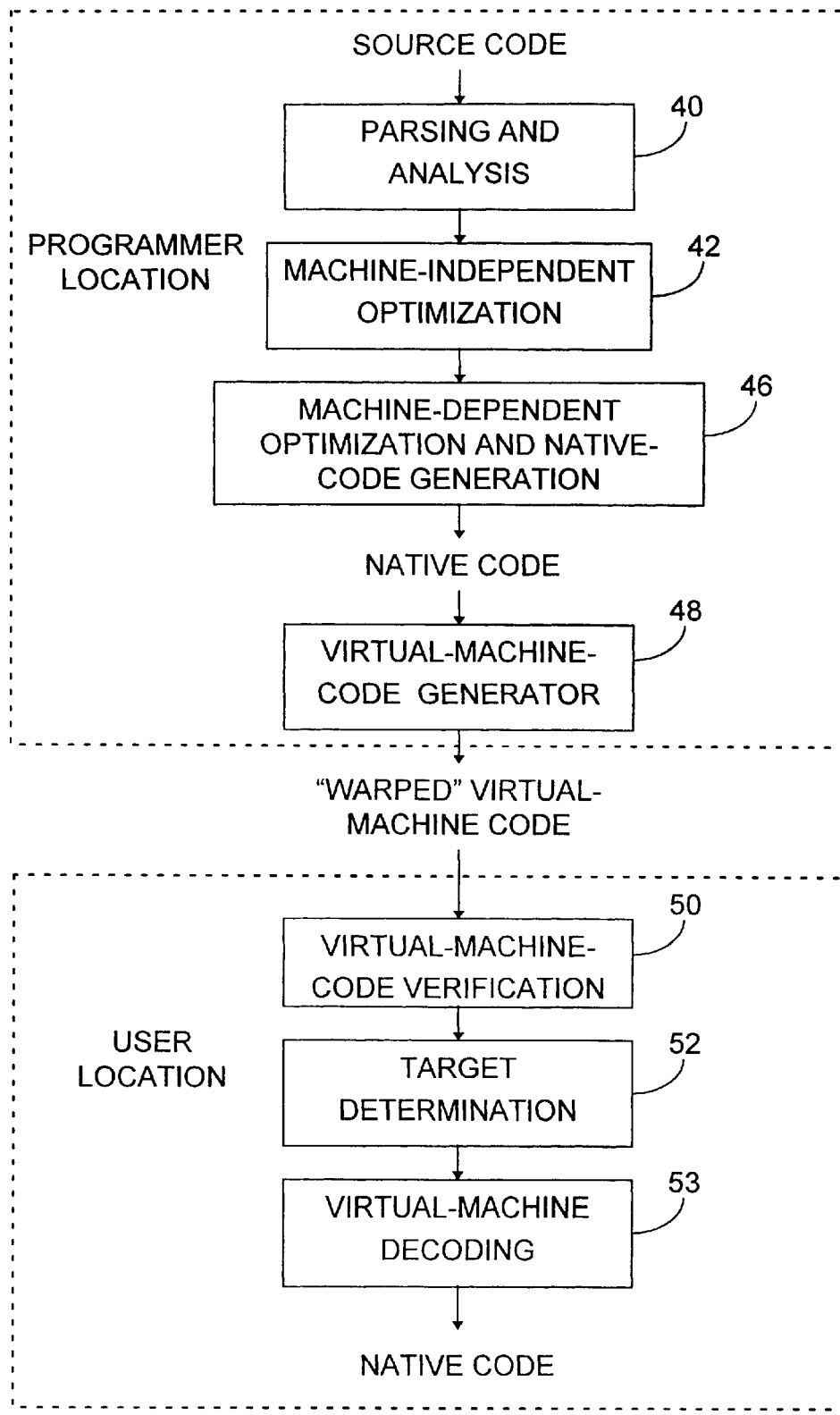
FIG. 4 is a flow chart that illustrates one embodiment of the present invention.

FIG. 4 represents the overall operational sequence that the illustrated embodiment's source and user systems follow. A system such as, say, FIG. 1's system 34 receives source code from the programmer. In accordance with its compiler program, that system performs FIG. 4's normal parsing and analysis 40 and machine-independent optimization 42, as is typical in virtual-machine-code generation. But the illustrated embodiment's compiler program also performs machine-dependent optimization and machine-code generation 46 for a specific target microprocessor, and the generic, stack-oriented code that a non-trusting user will accept is generated from this machine-specific, register-oriented code, as block 48 indicates. Since the optimization of step 46 is, as the other programmer-location operations are, done only once, its optimization can be performed to a level that would be too time-consuming for the ultimate users to perform.

Figures 1, 2:
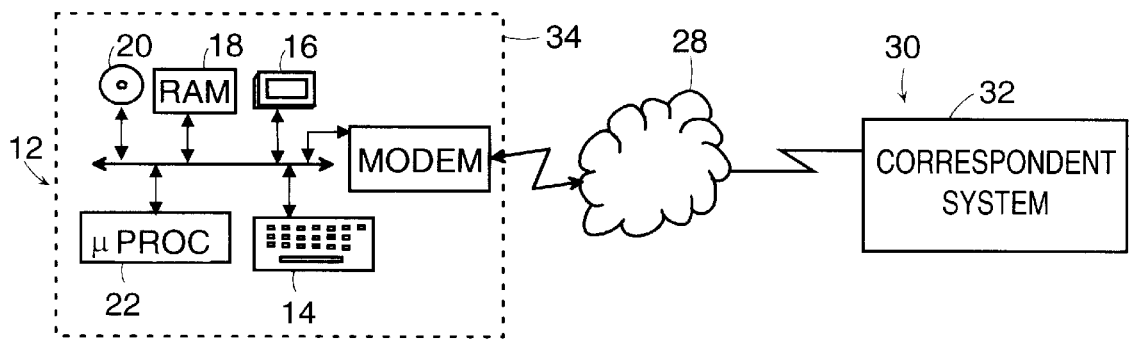
FIG. 1 is a block diagram of a computer system in which the present invention teachings can be practiced.
FIG. 2 is a listing of a source-code fragment from which virtual-machine code is generated in accordance with the present invention's teachings.

FIG. 1's system 34 puts the resultant code in a "class file" (described below) that it sends to client system 32, and system 32's virtual-machine-implementing software then produces the virtual-machine response to that code.

There are two general approaches to implementing the virtual machine: interpreting the byte code and compiling it. The virtual-machine-emulating software may perform either or both. When it performs interpretation, the run-time system's own code directs the microprocessor to fetch the virtual-machine instructions as data rather than instructions, and the virtual-machine-emulating software so branches on the values of those data (i.e., those virtual-machine instructions) as to emulate the operations that the virtual-machine instructions dictate.

But interpreter operation can be slow, so the virtual-machine-implementing system may instead adopt a "just-in-time" compiling approach. In accordance with this approach, the user's virtual-machine-implementing software translates the virtual-machine code into actual-machine code more or less concurrently with the process of loading in the virtual-machine code. Then it transfers control of the actual executing microprocessor to the machine code thus generated. Clearly, this approach can result in faster execution.

This is particularly so if the actual-machine code employs optimum global register allocation. As is well known, the typical computer system includes a spectrum of memory types, ranging from abundant but slow disk memory to very fast but scarce microprocessor registers. Instruction execution is fastest by far if the operands for a given operation are already in microprocessor registers. But there are only a few registers, so the speed of the given routine depends very much on which registers are allocated to which variables.

If variables whose uses frequently alternate are stored in the same register, for example, then execution will tend to be relatively slow, because one variable's value will often have to be written back to slow memory in order to make room in the register for the other variable's value-which will itself need to be fetched from slow memory. To the extent that registers can be globally allocated in a way that minimizes such swapping, execution will tend to be faster. As was stated above, though, the complexity of so allocating register contents can increase faster than linearly with the size of the code block for which the allocation is being performed. If that optimization procedure is performed concurrently with the run-time system's just-in-time compiling, therefore, the delay that the optimization procedure imposes soon compromises the benefits of optimizing global register allocation.

The present invention reduces this problem by providing a way in which the stack-oriented virtual-machine code generated in operation 48 can convey to the remote user's system the optimal global register allocation determined in step 46. To illustrate the way in which this is accomplished, we first turn to FIG. 5, which represents the register-oriented-microprocessor machine code that FIG. 4's step 46 generates. We assume for the sake of example that the actual microprocessor for which the code is to be optimized is a SPARC v.8 microprocessor, in which certain (thirty-two-bit) registers are named %i0-%i7, %g0-%g7, %l0-%l17, and %o0-%o7. For the particular processor involved in this case, the best way to set the limit value to FIG. 2's state 10,000,000 is, first, to employ a load-immediate operation in which a given register's most-significant twenty-two bits (the longest immediate value that this machine's language can load) receive the first twenty-two bits of that number's binary representation and, second, to add the remaining ten bits' value to the result. The decimal value of the first step's result is 9,999,360, and step A represents so setting register %o2's most-significant twenty-two bits as to result in that value.

Instruction B represents multiplying register %i1's contents (length) by those of register %i2 (width) and placing the result in register %o0. This is an example of the difference between a register-oriented machine and a stack-oriented virtual machine, to which the byte code is directed. That is, the register-oriented machine's individual instructions explicitly specify the operand and result locations, whereas the stack-oriented virtual-machine code leaves those location implicit, since they are always the top operand-stack positions.

Instruction C represents finishing the iteration limit's computation and its storage in register %i3, and instructions D-G represent clearing registers %i0, %i1, %i2, and %o1.

The source-code-specified loop then starts after label L1. Instruction H calls for incrementing register %i0's contents, namely, the current height value. If register %i0 initially contains the value 0, as instruction G's line indicates, then instruction H's operation places the value 1 in register %i0. But the drawing instead contains an h for height in that register's box. This represents the fact that successive iterations result in successive height values. Similarly, FIG. 5's columns representing registers %i1, %i2, and %o1 have new contents in instruction H's row to indicate that those registers will contain corresponding contents during subsequent iterations, even though they all contain only values of zero at the end of the first iteration's execution of instruction H.

Instruction I evidences the aggressive (and expensive) optimization that the compiler has performed in producing FIG. 5's machine code. Although FIG. 2's loop seems to require several (time-consuming) multiplications for each loop iteration, the compiler has rearranged the computations to avoid any such multiplications. Now, reflection reveals that the amount $\Delta V$ by which volume is incremented in each iteration is itself increased by the product of length and width during each iteration. So, rather than perform the multiplications that the source-code instructions seem to require, instruction I increments register %i2's contents, i.e., volume, by a $\Delta V$ value stored in register %o1 and updated in instruction M simply by adding to it the product lw of length and width. Instruction J similarly avoids a multiplication in incrementing area. Generating the product lw that those instructions use does require a multiplication, but that multiplication is performed in instruction B, i.e., once and for all outside the loop.

Instructions K and L represent comparing the incremented height value with the iteration limit, namely, 10,000,000, and branching back to L1 so long as the height value is less than that iteration limit. This might seem to result in omission of the $\Delta V$-incrementing instruction M until the loop is completed, but a feature of the particular microprocessor for which the machine code is written is that it executes one further instruction while the microprocessor is fetching the instruction to which the branch instruction directs it. Therefore, instruction M is performed during each loop iteration.

For the sake of illustration, we assume that FIG. 5's code is highly optimized for a particular target microprocessor. (In fact, the particular code there illustrated probably is nearly just as optimized for a number of types of microprocessors. But it is not in general true that code optimized for one microprocessor is so optimized for others.) We also assume that the programmer wants user systems to employ the FIG. 5 code's particular register allocation if their microprocessors are of the targeted type. Yet the source system must transmit stack-oriented, virtual-machine code, not FIG. 5's register-oriented-machine code.

FIGS. 6A and 6B (together, "FIG. 6") illustrate the manner in which the source system uses the stack-oriented-machine code to specify that register allocation. FIG. 6 represents the translation of FIG. 5's target-microprocessor machine code into the virtual-machine code that is to convey the desired global register allocation to those systems that employ microprocessors of the targeted type. In accordance with the invention, the source system's compiler associates registers %i0-%i7, %g0-%g7, %l0-%l17, and %o0-%o7 with local variables 0-7, 8-15, 16-23, and 24-31, respectively. To specify that the target microprocessor is to perform an instruction in which an arithmetic or logical operation is to be performed on an operand from a given register, the compiler first generates a virtual-machine instruction that pushes the corresponding local variable onto the operand stack. It then generates a virtual-machine instruction in which the operation code specifies the intended arithmetic or logical operation.

To illustrate this more concretely, we begin with FIG. 6's virtual-machine instructions A1 and A2, into which the programmer's compiler translates FIG. 3's stack-oriented instruction A. The class file that contains the byte code includes a constant pool, and instruction A1 specifies pushing onto the operand stack the constant pool's first entry, while instruction A2 represents popping the stack and placing the result in local variable 26, which the source system's compiler associates with the register %o2, i.e., with the register that instruction A loads. When cooperating virtual-machine-implementing programming in a user system employing the target microprocessor type receives these instructions, it translates them by noting that the local variable is one that it has set aside as a proxy for a microprocessor register, and it accordingly translates those virtual-machine instructions into its own microprocessor's machine code for loading that constant into its register %o2.

Microprocessor-machine-code instruction B specifies multiplying register %i1's contents by those of register %i2 and storing the result in register %o0. So the source system's compiler generates virtual-machine instructions B1 and B2, which specify pushing onto the stack the contents of the local variables, namely, variables 1 and 2, that correspond to the target-microprocessor operand registers %i1 and %i2 that instruction B designates. To specify multiplication, it generates instruction B3, which represents multiplying the stack contents drawn from those registers. And instruction B4 calls for placing the result in local variable 24, which corresponds to the instruction-B-designated output register %o0.

When the user system encounters instruction B3, therefore, it begins assembling the corresponding microprocessor-machine-code instruction by employing the corresponding operation code (smul). It then determines the local-variable sources of the stack entries that instruction B3's operation uses as operands, and it includes the codes for the corresponding registers in the machine-code instruction being assembled. It also includes the code for register %o0, which corresponds to control variable 24 into which instruction B4 stores instruction B3's results.

Instructions C1 through C4 similarly illustrate how to specify source and result registers by employing the corresponding local variables. They additionally illustrate using a constant-pool entry to specify a literal operand. Instructions D1 and D2, E1 and E2, F1 and F2, and G1 and G2 illustrate how to specify clearing particular registers: they load a constant value of zero into the top stack location and then pop that location into the local variable associated with the microprocessor register to be cleared.

The translations of microprocessor-machine-code instructions H, L, and J are is similar to instruction B's translation.

The translation of instructions K, L, and M illustrate particularly machine-dependent aspects of the translation process. As was explained in connection with FIG. 5, the target microprocessor always performs the instruction whose location in memory follows that of a branch instruction, even if the branch instruction sets the program counter to a different instruction address. This was illustrated by FIG. 5's instructions L and M. The virtual machine has no such feature, so the virtual-machine instructions into which the microprocessor machine instruction M is translated must precede those into which microprocessor instruction L is translated. Indeed, since FIG. 5's comparisons step K works together with its branch instruction L, the virtual-machine instructions into which instruction M is translated must precede the translations of instructions K and L both, as FIG. 6B shows.

FIG. 6B also illustrates that some of the microprocessor-machine-code instructions must be translated together; virtual-machine instruction KL3, which represent branching on the results of comparing the top two stack values, corresponds both to instruction L and to part of the operation that instruction K represents. That is, instruction K has a comparison component, which instruction KL3 includes, but the fetch operations of instructions KL1 and KL2 must be included to complete all of instructions K's functionality.

The virtual-machine code that results is "warped," i.e., targeted to a particular microprocessor. In a cooperating virtual-machine-implementing system, it dictates a global register allocation, and thereby substantially dictates an operation sequence, that is particularly well suited to the targeted microprocessor. Note that this result does not require the FIG. 4 operation's input to be high-level-language code such as that of FIG. 2. It could even be virtual-machine code not warped for the machine to which the FIG. 4 procedure is targeted. So the present invention's compiling operation is not limited to conversion of high-level code to lower-level code.

In principle, the virtual-machine instructions that result from FIGS. 6A and 6B's translation can be sent in any form to the system that is to implement them. In practice, the instructions are typically sent as part of a class file whose format is described in, for instance, Lindholm and Yellin, Java™ *Virtual Machine Specification,* Reading, Mass.:Addison-Wesley, 1996. When the remote, user system receives the class file, it verifies that the file and its included byte code meets various requirements with which legal byte code complies. Actually, this step is unnecessary in the scenario just described, in which a legal compiler incorporates the byte code into a legal-format class file. But the user cannot in general trust the source of a file received over the Internet, so the user's system verifies the code's form by performing many tests known to those skilled in this art. It may verify, for instance, that no operand-stack overflows or underflows have occurred, that all local-variable uses are valid, and that the data types of virtual-machine-instruction arguments are, too. It may additionally insure that the resultant routine references only valid data objects and does not treat data as instructions.

Once the byte code has been verified, the virtual machine could simply perform the translation reverse to that depicted in FIGS. 6A and 6B. This would be possible because, in accordance with the present invention, cooperating virtual-machine-implementing software contains the same predetermined association of virtual-machine local variables with microprocessor registers as the compiler does. But the virtual-machine-implementing software does not always know ahead of time that its received byte code has been targeted to microprocessors of the type for which it will be generating microprocessor machine instructions. So it first needs to perform an operation, represented by block 52, in which it makes that determination.

That determination can take many forms. One form is simply to begin the decoding process 53 in accordance with the assumption that the byte code has been so compiled as to target the user system's microprocessor. That is, it interprets local-variable references in accordance with the predetermined microprocessor-register association. If that assumption is inaccurate, then an inconsistency will appear during translation of the microprocessor machine code thus generated.

Another approach can rely on certain warped-code characteristics. One such characteristic is that an operation's result is always stored initially in one of the local variables used as register proxies. If byte code directs the virtual machine initially to store a result in one of the other local variables, then the code is not warped code. Also, the warped-code-generating program preferably results in code that does not place more operands on the stack than necessary. This is not a requirement of a warped-code generator, but, if the virtual-machine-implementing software can rely on such a characteristic, it can conclude that the code is not warped if, say, the code results in the stack's containing more than two operands at the beginning of a (two-operand) add operation.

If the code is determined not to be warped, then the virtual-machine-implementing program performs the decoding process in the more-conventional manner, in which the virtual-machine code's local-variable use is not interpreted as directly dictating the register allocation. Otherwise, the user system bases its microprocessor-code generation on the assumption that a virtual-machine instruction's access of a register-associated local variable requires a corresponding access of the associated microprocessor register.

Another approach to determining whether the user's microprocessor has been targeted requires that the class file explicitly identify whether it is targeting a particular microprocessor type and indicate which microprocessor type that is. The identifying information could be included as one of the "attributes" in the class file. To illustrate this approach, FIG. 7's first row illustrates the class-file format in a highly simplified manner.

Figure 7:
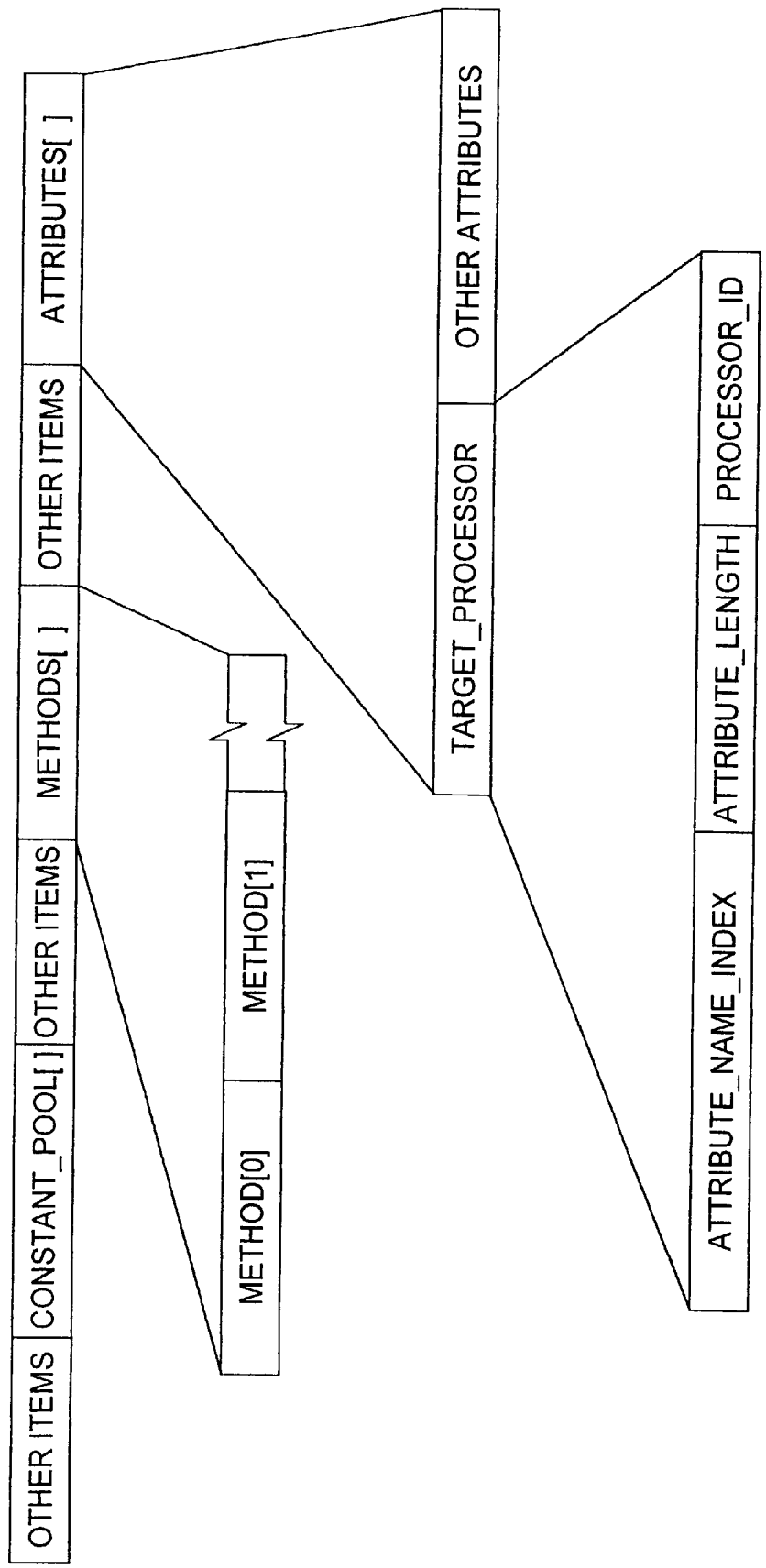
FIG. 7 is a diagram of the format of the class file containing the resultant byte code.

The above-mentioned type of class file contains sixteen highest-level fields, or "items," as they are called in the public descriptive literature. FIG. 7's first row shows only the class file's above-mentioned constant-pool table and its method and attribute tables separately from its other items. As FIG. 7's second row indicates, the method table consists of a number of (generally different-sized) method items. As will be seen in more detail in connection with FIG. 9 below, these items' contents include the method-defining byte code that the programmer's compiler generated.

FIG. 7's third row indicates that the attribute table of FIG. 7's first row conventionally includes a number of attributes. Some attributes are mandatory. In addition to those and possibly some other, optional attributes, the embodiment that FIG. 7 illustrates includes what we will refer to as the "target_processor" attribute. FIG. 7's fourth row shows that the target_processor attribute's first item would typically be a two-byte index into the constant-pool table. The entry in this table to which the attribute-name index of FIG. 7's fourth line points is an ASCII string, e.g., "target_processor," that identifies the attribute type. The attribute's second item is a four-byte field that tells how many further bytes the attribute contains, while the third item's contents could serve to identify the particular processor type for which the byte code is targeted. The contents could be an explicit identifier, or they could instead be an index to a constant-pool entry that identifies the microprocessor type.

If the class file contains no target_processor attribute, then the user's system treats the byte code in the conventional manner. If that attribute is present and identifies the local microprocessor's type, on the other hand, then the user's system will treat the byte code as warped, but it will typically still impose a test for legal warped code. If the code fails that test, then the user system may attempt to execute that class's code as conventional byte code.

Figure 8:
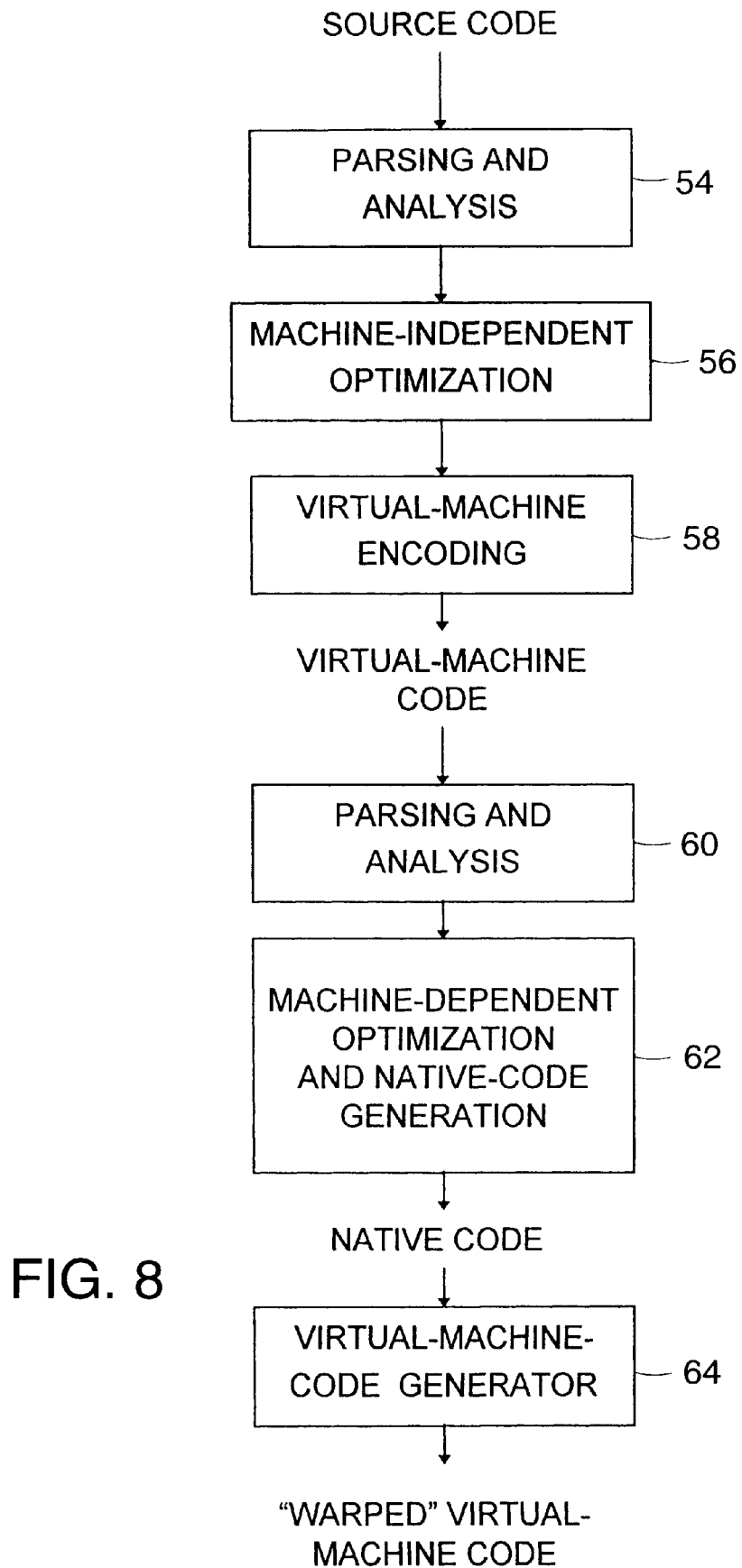
FIG. 8 is a flow chart of an alternative of embodiment of the present invention.
Figure 9:
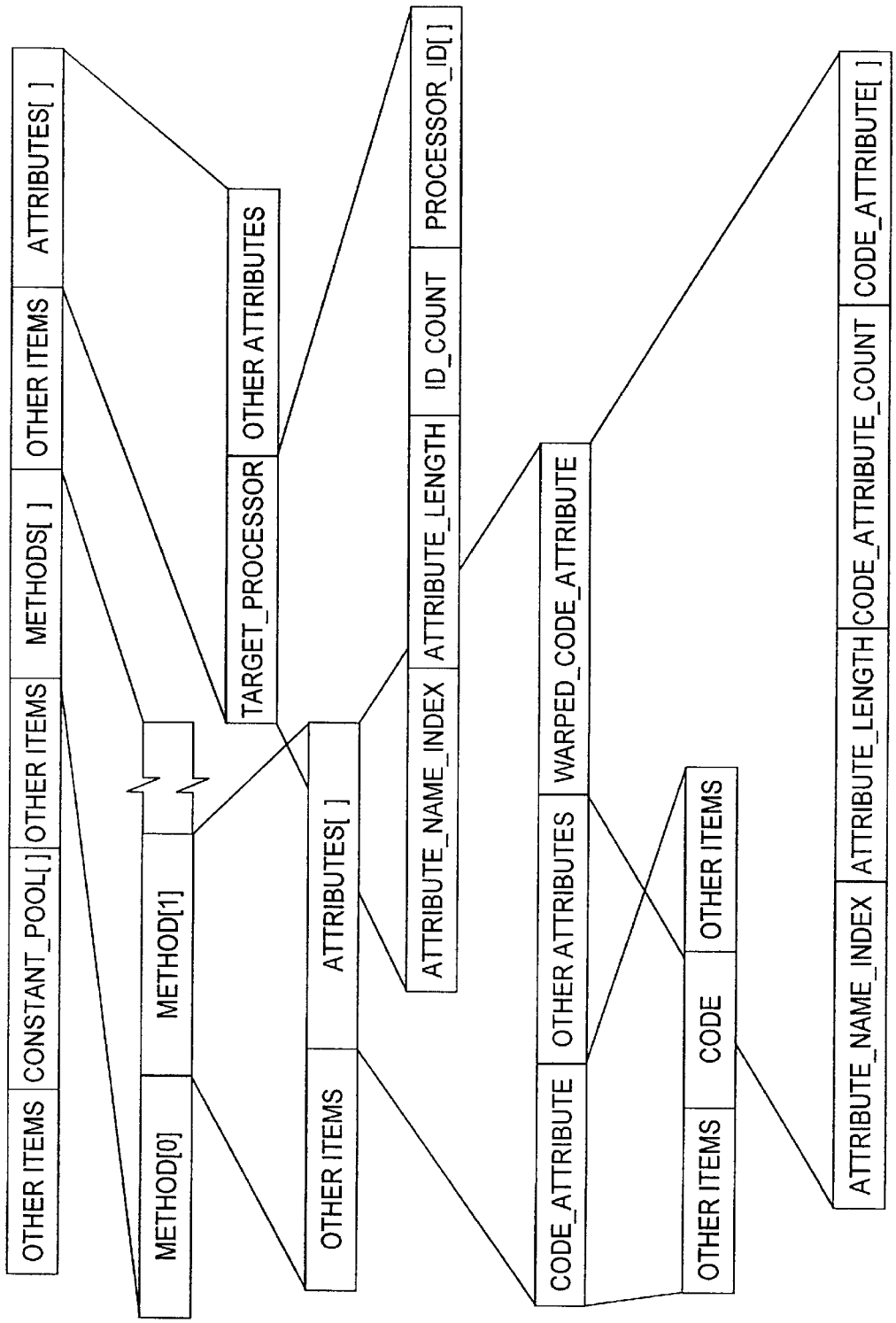
FIG. 9 is a diagram of a class-file format that can be used to contain the output of the FIG. 8 embodiment.

Although the target machine's use of the warped byte code results in optimized operation, other microprocessors that emulate the virtual machine's execution of the byte code may actually operate more sluggishly than they would in response to code not so targeted. FIGS. 8 and 9 depict ways to avoid this result.

FIG. 8's steps 54 and 56 correspond to FIG. 4's parsing-and-analysis and machine-independent-optimization steps 40 and 42. But the FIG. 8 approach differs in that a virtual-machine-code-generation step 58 precedes any optimization specific to the targeted microprocessor. So its output is unwarped byte code, which will typically be preferred when the local microprocessor is not of the type that the warped code targets.

To generate warped code, step 58's output is fed as input to a parsing-and-analysis step 60. From that step's output, machine-independent optimization and native-code generation 62 results in microprocessor machine code that step 64 translates into virtual-machine code in the process that FIGS. 6A and 6B depict. The resultant virtual-machine code differs from step 58's output in that it has been warped to lend itself to the type of register-specifying translation previously described.

That warped code can be placed in a class file separate from the class file that contains step 58's unwarped output, and the user system can choose among class files containing different versions of the same program. That choice can be facilitated by employing a predetermined class-file naming convention to identify the variety of virtual-machine code. For instance, the file containing the unwarped version of a given program could be called, say, "foo.class," while files containing warped versions of the same program could be named, say, "foo.class.sparcv8" or "foo.class.alpha" to specify the microprocessors for which they are warped. Alternatively, a directory-structure expedient could be adopted. For example, a warped version of class file stored at root\foo.class might be found at root\sparcv8\foo.class. By so selecting, the user system could avoid FIG. 4's target-determination step 52, although it would likely perform a similar operation anyway to verify that the code is consistent with its class file's name or location.

As another alternative, a single class file could contain all versions. FIG. 9 depicts a class-file format that can be used for that purpose. That drawing's first three rows are the same as the corresponding rows of FIG. 7, but the target_processor-attribute format of its fourth row provides for more than one processor identifier. Its id_count item gives the number of processor_id entries in a processor_id table that follows that item. Each entry identifies a targeted processor, just as the single processor_id item in FIG. 7's fourth row does.

The FIG. 9 file must not only identify the targeted microprocessors but also contain code targeted to them. To that end, each method item includes among its attributes not only the conventional code attribute but also a warped_code attribute, as the sixth row shows. The seventh row shows that a conventional code attribute's format includes a code item among other items (one of which indicates how many bytes are in the code item). The code item consists of the actual (unwarped) byte code produced in FIG. 8's step 58. FIG. 9's eighth row shows that the warped code attribute includes a table of code attributes having a number of entries indicated by its code_attribute_count item. Each entry has the format that the seventh row sets forth. Each entry corresponds to the same-index entry in the processor_id table, and its code item consists of byte code produced by FIG. 8's step 64 for the microprocessor that the corresponding processor_id-table entry identifies.

Virtual machines implemented in software that does not recognize the target_processor attribute can execute the conventionally located code in FIG. 9's seventh row. This code will also be run if the implementing microprocessor is not one that a processor_id-table entry identifies. But a virtual machine that recognizes the target_processor attribute and interprets one of the processor_id-table entries as identifying the local microprocessor will run the code in the corresponding code_attribute-table entry.

In place of the eighth row's table of ordinarily formatted code attributes, some embodiments may use a table of a different attribute type, one whose contents include, say, a data-reduced ("compacted") version of the warped code. In that case the virtual machine would have to re-expand the contents before using them.

Figure 10:
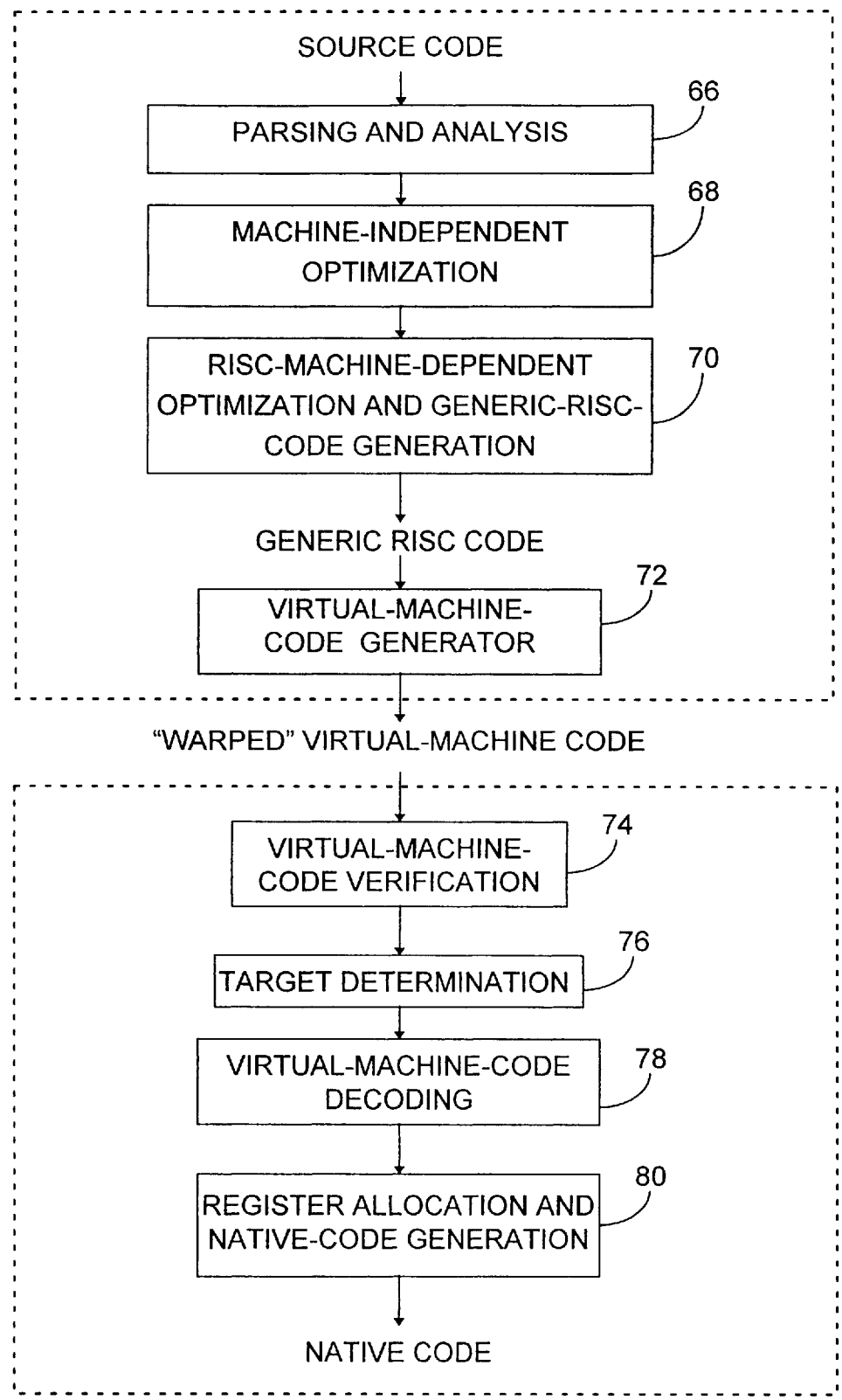
FIG. 10 is a flow chart of yet another embodiment of the present invention.

Some implementations of the present invention's broader teachings may not constrain global register allocation as much as the previously described embodiments do. FIG. 10 illustrates such an implementation. FIG. 10's parsing-and-analysis and machine-independent-optimization steps 66 and 68 are similar to corresponding steps of FIGS. 4 and 8, but FIG. 10 employs a step 70 that generates code for, say, a generic register-oriented machine of the reduced-instruction-set-computing ("RISC") class. In other words, it would generate code not for the generally recognized stack-oriented virtual machine but rather for a virtual machine that implements specific, register-oriented instructions. The assumed architecture would not necessarily match that of any real-world microprocessor, and it might include an unlimited, or very large, number of registers, i.e., more registers than the typical real-world microprocessor. It is the resultant, generic RISC code whose translation by the programmer's compiler into the stack-oriented virtual-machine code block 72 represents.

At the user side, byte-code verification 74, target-process determination 76, and decoding 78 would be substantially similar to FIG. 4's steps 50, 52, and 53. The major difference in the target-determination step 76 is that the user's system determines whether the code has been warped for a class to which the user's microprocessor type belongs, not whether it has been warped for that microprocessor's specific type. For instance, if the user's microprocessor is a Sun Microsystems SPARC v. 8 microprocessor, which is of the reduced-instruction-set variety, then the virtual machine will choose the warped code version if the class file's target_processor attribute indicates that it has a separate code version optimized for RISC microprocessors. Alternatively, the user system could choose a class file whose name or location identifies it as containing code warped for RISC microprocessors.

The register references in the decoding process 78's instruction output would not in general be consistent with the register complement of the user's microprocessor, so the user's system would need to perform global register allocation, as block 80 indicates. The register-allocation process tends to be simpler than it would be for conventionally compiled byte code, though. As those skilled in the art are aware, the register-allocation process typically starts with identifying the ranges of program execution through which various values are active. If the generic-RISC-code generation has been so based on an unlimited-register virtual machine that each value is assigned its own register, the problem reduces to identifying register-reference ranges. Additionally, since that RISC code's instruction set is similar to that of the user's microprocessor, the program's execution is faster than it would be conventionally.

From the foregoing description it is apparent that the present invention's advantages can be realized in a wide range of embodiments. It thus constitutes a significant advance in the art.

What is claimed is:

1. For performing a computer program specified by source code, a system comprising:
   A) a first computer system for:
      i) performing a conversion of the source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack in a local variable and (ii) a variable code that explicitly specifies that local variable, the conversion comprising:
         a) translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;
         b) associating a different stack-oriented-machine-code local variable with each of a plurality of the machine registers; and
         c) translating the register-oriented-machine code into the stack-oriented-machine code by:
            (1) for each machine-code instruction that specifies performing a given arithmetic or logical operation and explicitly specifies a given machine register from which an operand of that arithmetic or logical operation is to be drawn, generating:
               (a) a stack-oriented-machine-code instruction that includes:
                  (i) a stack-oriented-machine operation code that explicitly specifies the stack-oriented-machine-code local variable associated with the given machine register; and
                  (ii) a variable code that specifies loading the operand stack with a local variable; and
               (b) a stack-oriented-machine-code instruction that specifies performing that arithmetic or logical operation and placing the result in the operand stack; and
            (2) for each machine-code instruction that specifies performing a given arithmetic operation and explicitly specifies a given machine register that is to receive the operation's result, generating:
               (a) a stack-oriented-machine-code instruction that specifies performing that arithmetic or logical operation and placing the result in the operand stack; and
               (b) a stack-oriented-machine-code instruction for storing contents of the operand stack in the local variable associated with the given register; and
         ii) transmitting the resultant stack-oriented-machine code; and
   B) a second computer system, including a microprocessor, for receiving the stack-oriented machine code transmitted by the first computer system, translating the stack-oriented machine code into register-oriented machine code, and operating its microprocessor in accordance with the register-oriented-machine code.

2. A system as defined in claim 1 wherein the register-oriented-machine code into which the second computer system translates the stack-oriented machine code dictates the same register allocation as the register-oriented machine code into which the first computer system translates the source code.

3. A system as defined in claim 2 wherein the register-oriented-machine code into which the first computer system translates the source code is valid machine code for the microprocessor that the second computer system includes.

4. A system as defined in claim 3 wherein the register-oriented-machine code into which the second computer system translates the stack-oriented machine code is the same as the register-oriented-machine code into which the first computer system translates the source code.

5. A computer system configured by machine-readable instructions to operate as an apparatus for performing a conversion of source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack in a local variable and (ii) a variable code that explicitly specifies that local variable, the conversion comprising:
   A) translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;
   B) associating a different stack-oriented-machine-code local variable with each of a plurality of the machine registers; and
   C) translating the register-oriented-machine code into the stack-oriented-machine code by:
      i) for each machine-code instruction that specifies performing a given arithmetic or logical operation and explicitly specifies a given machine register from which an operand of that arithmetic or logical operation is to be drawn, generating:

a) a stack-oriented-machine-code instruction that includes:
  (1) a stack-oriented-machine operation code that explicitly specifies the stack-oriented-machine-code local variable associated with the given machine register; and
  (2) a variable code that specifies loading the operand stack with a local variable; and
b) a stack-oriented-machine-code instruction that specifies performing that arithmetic or logical operation and placing the result in the operand stack; and ii) for each machine-code instruction that specifies performing a given arithmetic operation and explicitly specifies a given machine register that is to receive the operation's result, generating:
  a) a stack-oriented-machine-code instruction that specifies performing that arithmetic or logical operation and placing the result in the operand stack; and
  b) a stack-oriented-machine-code instruction for storing contents of the operand stack in the local variable associated with the given register.

6. A computer system, including a microprocessor that includes a plurality of machine registers, that is configured by machine-readable instructions to emulate a stack-oriented machine by:

A) receiving stack-oriented machine code;
B) associating a different stack-oriented-machine-code local variable with each of a plurality of the machine registers;
C) translating the stack-oriented-machine code into the register-oriented-machine code for the microprocessor in a process that includes:
  i) translating, into one of the microprocessor's machine-code instructions that specifies performing a given arithmetic or logical operation and explicitly specifies a given machine register from which an operand of that arithmetic or logical operation is to be drawn, a combination of stack-oriented-machine-code instructions including:
    a) a stack-oriented-machine-code instruction that includes:
      (1) a stack-oriented-machine operation code that explicitly specifies the stack-oriented-machine-code local variable associated with the given machine register; and
      (2) a variable code that specifies loading the operand stack with a local variable; and
    b) a stack-oriented-machine-code instruction that specifies performing that arithmetic or logical operation and placing the result in the operand stack; and
  ii) translating, into one of the microprocessor's machine-code instructions that specifies performing a given arithmetic operation and explicitly specifies a given machine register that is to receive the operation's result, a combination of stack-oriented-machine-code instructions including:
    a) a stack-oriented-machine-code instruction that specifies performing that arithmetic or logical operation and placing the result in the operand stack; and
    b) a stack-oriented-machine-code instruction for storing contents of the operand stack in the local variable associated with the given register; and
D) operating the microprocessor in accordance with the register-oriented-machine code thereby generated.

7. For performing a computer program specified by source code, a system comprising:

A) a first computer system comprising:
  i) means for performing a conversion of the source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack with a local variable and (ii) a variable code that explicitly specifies that local variable, the conversion means comprising:
    a) means for translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;
    b) means for associating a different stack-oriented-machine-code local variable with each of a plurality of the machine registers; and
    c) means for translating the register-oriented-machine code into the stack-oriented-machine code by:
      (1) for each machine-code instruction that specifies performing a given arithmetic or logical operation and explicitly specifies a given machine register from which an operand of that arithmetic or logical operation is to be drawn, generating:
        (a) a stack-oriented-machine-code instruction that includes:
      (i) a stack-oriented-machine operation code that explicitly specifies the stack-oriented-machine-code local variable associated with the given machine register; and
      (ii) a variable code that specifies loading the operand stack with a local variable; and
        (b) a stack-oriented-machine-code instruction that specifies performing that arithmetic or logical operation and placing the result in the operand stack; and
      (2) for each machine-code instruction that specifies performing a given arithmetic operation and explicitly specifies a given machine register that is to receive the operation's result, generating:
        (a) a stack-oriented-machine-code instruction that specifies performing that arithmetic or logical operation and placing the result in the operand stack; and
        (b) a stack-oriented-machine-code instruction for storing contents of the operand stack in the local variable associated with the given register; and
  ii) means for transmitting the resultant stack-oriented-machine code; and
B) a second computer system, including a microprocessor, comprising:
  i) means for receiving the stack-oriented machine code transmitted by the first computer system;

ii) means for translating the stack-oriented machine code into register-oriented machine code; and iii) means for operating its microprocessor in accordance with the register-oriented-machine code.

8. A system as defined in claim 7 wherein the register-oriented-machine code into which the second computer system translates the stack-oriented machine code dictates the same register allocation as the register-oriented machine code into which the first computer system translates the source code.

9. A system as defined in claim 8 wherein the register-oriented-machine code into which the first computer system translates the source code is valid machine code for the microprocessor that the second computer system includes.

10. A system as defined in claim 9 wherein the register-oriented-machine code into which the second computer system translates the stack-oriented machine code is the same as the register-oriented-machine code into which the first computer system translates the source code.

11. A computer system configured by machine-readable instructions to operate as an apparatus for performing a conversion of source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack in a local variable and (ii) a variable code that explicitly specifies that local variable, the apparatus for performing the conversion comprising:

A) means for translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;

B) means for associating a different stack-oriented-machine-code local variable with each of a plurality of the machine registers; and C) means for translating the register-oriented-machine code into the stack-oriented-machine code by:

i) for each machine-code instruction that specifies performing a given arithmetic or logical operation and explicitly specifies a given machine register from which an operand of that arithmetic or logical operation is to be drawn, generating:

a) a stack-oriented-machine-code instruction that includes:

(1) a stack-oriented-machine operation code that explicitly specifies the stack-oriented-machine-code local variable associated with the given machine register; and (2) a variable code that specifies loading the operand stack with a local variable; and b) a stack-oriented-machine-code instruction that specifies performing that arithmetic or logical operation and placing the result in the operand stack; and ii) for each machine-code instruction that specifies performing a given arithmetic operation and explicitly specifies a given machine register that is to receive the operation's result, generating:

a) a stack-oriented-machine-code instruction that specifies performing that arithmetic or logical operation and placing the result in the operand stack; and b) a stack-oriented-machine-code instruction for storing contents of the operand stack in the local variable associated with the given register.

12. A computer system, including a microprocessor that includes a plurality of machine registers and comprising:

A) means for receiving stack-oriented machine code;

B) means for associating a different stack-oriented-machine-code local variable with each of a plurality of the machine registers;

C) means for translating the stack-oriented-machine code into the register-oriented-machine code for the microprocessor in a process that includes:

i) translating, into one of the microprocessor's machine-code instructions that specifies performing a given arithmetic or logical operation and explicitly specifies a given machine register from which an operand of that arithmetic or logical operation is to be drawn, a combination of stack-oriented-machine-code instructions including:

a) a stack-oriented-machine-code instruction that includes:

(1) a stack-oriented-machine operation code that explicitly specifies the stack-oriented-machine-code local variable associated with the given machine register; and (2) a variable code that specifies loading the operand stack with a local variable; and b) a stack-oriented-machine-code instruction that specifies performing that arithmetic or logical operation and placing the result in the operand stack; and ii) translating, into one of the microprocessor's machine-code instructions that specifies performing a given arithmetic operation and explicitly specifies a given machine register that is to receive the operation's result, a combination of stack-oriented-machine-code instructions including:

a) a stack-oriented-machine-code instruction that specifies performing that arithmetic or logical operation and placing the result in the operand stack; and b) a stack-oriented-machine-code instruction for storing contents of the operand stack in the local variable associated with the given register; and D) means for operating the microprocessor in accordance with the register-oriented-machine code thereby generated.

13. For performing a computer program specified by source code, a method comprising the steps of:

A) in a first computer system, performing a conversion of the source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack in a local variable and (ii) a variable code that explicitly specifies that local variable, the conversion comprising:

i) translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;

ii) associating a different stack-oriented-machine-code local variable with each of a plurality of the machine registers; and iii) translating the register-oriented-machine code into the stack-oriented-machine code by:

a) for each machine-code instruction that specifies performing a given arithmetic or logical operation and explicitly specifies a given machine register from which an operand of that arithmetic or logical operation is to be drawn, generating:

(1) a stack-oriented-machine-code instruction that includes:

(a) a stack-oriented-machine operation code that explicitly specifies the stack-oriented-machine-code local variable associated with the given machine register; and (b) a variable code that specifies loading the operand stack with a local variable; and (2) a stack-oriented-machine-code instruction that specifies performing that arithmetic or logical operation and placing the result in the operand stack; and b) for each machine-code instruction that specifies performing a given arithmetic operation and explicitly specifies a given machine register that is to receive the operation's result, generating:

(1) a stack-oriented-machine-code instruction that specifies performing that arithmetic or logical operation and placing the result in the operand stack; and (2) a stack-oriented-machine-code instruction for storing contents of the operand stack in the local variable associated with the given register;

B) transmitting the resultant stack-oriented-machine code to a second computer system, which includes a microprocessor; and C) employing the second computer system to receive the stack-oriented machine code transmitted by the first computer system, translate the stack-oriented machine code into register-oriented machine code, and operating the microprocessor in accordance with the register-oriented-machine code.

14. A method as defined in claim 13 wherein the register-oriented-machine code into which the second computer system translates the stack-oriented machine code dictates the same register allocation as the register-oriented machine code into which the first computer system translates the source code.

15. A system as defined in claim 14 wherein the register-oriented-machine code into which the first computer system translates the source code is valid machine code for the microprocessor that the second computer system includes.

16. A system as defined in claim 15 wherein the register-oriented-machine code into which the second computer system translates the stack-oriented machine code is the same as the register-oriented-machine code into which the first computer system translates the source code.

17. For performing a conversion of source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack in a local variable and (ii) a variable code that explicitly specifies that local variable, a method comprising the steps of:

A) translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;

B) associating a different stack-oriented-machine-code local variable with each of a plurality of the machine registers; and C) translating the register-oriented-machine code into the stack-oriented-machine code by:

for each machine-code instruction that specifies performing a given arithmetic or logical operation and explicitly specifies a given machine register from which an operand of that arithmetic or logical operation is to be drawn, generating:

a) a stack-oriented-machine-code instruction that includes:

(1) a stack-oriented-machine operation code that explicitly specifies the stack-oriented-machine-code local variable associated with the given machine register; and (2) a variable code that specifies loading the operand stack with a local variable; and b) a stack-oriented-machine-code instruction that specifies performing that arithmetic or logical operation and placing the result in the operand stack; and ii) for each machine-code instruction that specifies performing a given arithmetic operation and explicitly specifies a given machine register that is to receive the operation's result, generating:

a) a stack-oriented-machine-code instruction that specifies performing that arithmetic or logical operation and placing the result in the operand stack; and a stack-oriented-machine-code instruction for storing contents of the operand stack in the local variable associated with the given register.

18. For operating a computer system that includes a microprocessor including a plurality of machine registers, a method comprising:

A) receiving stack-oriented machine code at the computer system;

B) associating a different stack-oriented-machine-code local variable with each of a plurality of the machine registers;

C) employing the computer system to translate the stack-oriented-machine code into the register-oriented-machine code for the microprocessor in a process that includes:

i) translating, into one of the microprocessor's machine-code instructions that specifies performing a given arithmetic or logical operation and explicitly specifies a given machine register from which an operand of that arithmetic or logical operation is to be drawn, a combination of stack-oriented-machine-code instructions including:
- a) a stack-oriented-machine-code instruction that includes:
  - (1) a stack-oriented-machine operation code that explicitly specifies the stack-oriented-machine-code local variable associated with the given machine register; and
  - (2) a variable code that specifies loading the operand stack with a local variable; and
- b) a stack-oriented-machine-code instruction that specifies performing that arithmetic or logical operation and placing the result in the operand stack; and ii) translating, into one of the microprocessor's machine-code instructions that specifies performing a given arithmetic operation and explicitly specifies a given machine register that is to receive the operation's result, a combination of stack-oriented-machine-code instructions including:
- a) a stack-oriented-machine-code instruction that specifies performing that arithmetic or logical operation and placing the result in the operand stack; and
- b) a stack-oriented-machine-code instruction for storing contents of the operand stack in the local variable associated with the given register; and D) operating the microprocessor in accordance with the register-oriented-machine code thereby generated.

19. A storage medium containing instructions readable by a computer to configure the computer to operate as an apparatus for performing a conversion of source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack in a local variable and (ii) a variable code that explicitly specifies that local variable, the conversion comprising:

A) translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;

B) associating a different stack-oriented-machine-code local variable with each of a plurality of the machine registers; and C) translating the register-oriented-machine code into the stack-oriented-machine code by:
  i) for each machine-code instruction that specifies performing a given arithmetic or logical operation and explicitly specifies a given machine register from which an operand of that arithmetic or logical operation is to be drawn, generating:
    a) a stack-oriented-machine-code instruction that includes:
      (1) a stack-oriented-machine operation code that explicitly specifies the stack-oriented-machine-code local variable associated with the given machine register; and
      (2) a variable code that specifies loading the operand stack with a local variable; and
    b) a stack-oriented-machine-code instruction that specifies performing that arithmetic or logical operation and placing the result in the operand stack; and
  ii) for each machine-code instruction that specifies performing a given arithmetic operation and explicitly specifies a given machine register that is to receive the operation's result, generating:
    a) a stack-oriented-machine-code instruction that specifies performing that arithmetic or logical operation and placing the result in the operand stack; and
    b) a stack-oriented-machine-code instruction for storing contents of the operand stack in the local variable associated with the given register.

20. A storage medium containing instructions readable by a computer, including a microprocessor that includes a plurality of machine registers, to configure the to emulate a stack-oriented machine by:

A) receiving stack-oriented machine code;
B) associating a different stack-oriented-machine-code local variable with each of a plurality of the machine registers;
C) translating the stack-oriented-machine code into the register-oriented-machine code for the microprocessor in a process that includes:
  i) translating, into one of the microprocessor's machine-code instructions that specifies performing a given arithmetic or logical operation and explicitly specifies a given machine register from which an operand of that arithmetic or logical operation is to be drawn, a combination of stack-oriented-machine-code instructions including:
    a) a stack-oriented-machine-code instruction that includes:
      (1) a stack-oriented-machine operation code that explicitly specifies the stack-oriented-machine-code local variable associated with the given machine register; and
      (2) a variable code that specifies loading the operand stack with a local variable; and
    b) a stack-oriented-machine-code instruction that specifies performing that arithmetic or logical operation and placing the result in the operand stack; and
  ii) translating, into one of the microprocessor's machine-code instructions that specifies performing a given arithmetic operation and explicitly specifies a given machine register that is to receive the operation's result, a combination of stack-oriented-machine-code instructions including:
    a) a stack-oriented-machine-code instruction that specifies performing that arithmetic or logical operation and placing the result in the operand stack; and
    b) a stack-oriented-machine-code instruction for storing contents of the operand stack in the local variable associated with the given register; and
D) operating the microprocessor in accordance with the register-oriented-machine code thereby generated.

21. A computer data signal embodied in a carrier wave and representing sequences of instructions that, when executed by a processor, cause it to operate as an apparatus for performing a conversion of source code into stack-oriented-machine code that consists of a sequence of stack-oriented-machine-code instructions of which each of a plurality consists of a stack-oriented-machine operation code that represents an arithmetic or logical operation and implicitly specifies drawing that operation's operands from and placing its result in a common operand stack, and of which each of a further plurality consists of (i) a stack-oriented-machine operation code that represents loading the operand stack with a local variable or storing contents from that operand stack in a local variable and (ii) a variable code that explicitly specifies that local variable, the conversion comprising:

A) translating the source code into register-oriented-machine code that consists of a sequence of machine-code instructions of which each of a plurality consists of (i) a machine operation code that represents an arithmetic or logical operation and (i) at least one register code that explicitly specifies a machine register from which the operation is to draw its operand and/or store its results;

B) associating a different stack-oriented-machine-code local variable with each of a plurality of the machine registers; and C) translating the register-oriented-machine code into the stack-oriented-machine code by:
 i) for each machine-code instruction that specifies performing a given arithmetic or logical operation and explicitly specifies a given machine register from which an operand of that arithmetic or logical operation is to be drawn, generating:
  a) a stack-oriented-machine-code instruction that includes:
   (1) a stack-oriented-machine operation code that explicitly specifies the stack-oriented-machine-code local variable associated with the given machine register; and
   (2) a variable code that specifies loading the operand stack with a local variable; and
  b) a stack-oriented-machine-code instruction that specifies performing that arithmetic or logical operation and placing the result in the operand stack; and
 ii) for each machine-code instruction that specifies performing a given arithmetic operation and explicitly specifies a given machine register that is to receive the operation's result, generating:
  a) a stack-oriented-machine-code instruction that specifies performing that arithmetic or logical operation and placing the result in the operand stack; and
  b) a stack-oriented-machine-code instruction for storing contents of the operand stack in the local variable associated with the given register.

22. A computer data signal embodied in a carrier wave and representing sequences of instructions that, when executed by a microprocessor that includes a plurality of machine registers, configure the microprocessor to emulate a stack-oriented machine by:

A) receiving stack-oriented machine code;

B) associating a different stack-oriented-machine-code local variable with each of a plurality of the machine registers;

C) translating the stack-oriented-machine code into the register-oriented-machine code for the microprocessor in a process that includes:
 i) translating, into one of the microprocessor's machine-code instructions that specifies performing a given arithmetic or logical operation and explicitly specifies a given machine register from which an operand of that arithmetic or logical operation is to be drawn, a combination of stack-oriented-machine-code instructions including:
  a) a stack-oriented-machine-code instruction that includes:
   (1) a stack-oriented-machine operation code that explicitly specifies the stack-oriented-machine-code local variable associated with the given machine register; and
   (2) a variable code that specifies loading the operand stack with a local variable; and
  b) a stack-oriented-machine-code instruction that specifies performing that arithmetic or logical operation and placing the result in the operand stack; and
 ii) translating, into one of the microprocessor's machine-code instructions that specifies performing a given arithmetic operation and explicitly specifies a given machine register that is to receive the operation's result, a combination of stack-oriented-machine-code instructions including:
  a) a stack-oriented-machine-code instruction that specifies performing that arithmetic or logical operation and placing the result in the operand stack; and
  b) a stack-oriented-machine-code instruction for storing contents of the operand stack in the local variable associated with the given register; and D) operating the microprocessor in accordance with the register-oriented-machine code thereby generated.

* * * * *